United States Patent

[11] 3,628,555

[72] Inventors Yoshihiko Nagano;
Kenichi Yamaguchi; Tomohisa Yamamoto,
all of Kawasaki, Japan
[21] Appl. No. 11,403
[22] Filed Feb. 16, 1970
[45] Patented Dec. 21, 1971
[73] Assignee Nippon Kokan Kabushiki Kaisha
Tokyo, Japan
[32] Priority Feb. 15, 1969
[33] Japan
[31] 44/10893

[54] SYSTEM FOR CONTROLLING THE CONTENT OF ONE FLUID IN ANOTHER FLUID
6 Claims, 3 Drawing Figs.
[52] U.S. Cl. .................................................. 137/88,
137/93, 236/44 A, 261/130
[51] Int. Cl. .................................................. G05d 22/02,
G05d 11/08, G05d 21/02

[50] Field of Search.......................................... 137/87, 88,
93; 236/44 A, 44 R; 73/29, 336.5; 110/53;
261/130, 131

[56] References Cited
UNITED STATES PATENTS
3,022,667  2/1962  Wexler et al. ..................  73/336.5
3,031,881  5/1962  Thorson .......................  73/29 X
3,269,715  8/1966  Wellford ......................  236/44 R X
3,385,680  5/1968  Feld et al. ....................  137/88 X Primary Examiner—Herbert F. Ross
Assistant Examiner—David J. Zobkiw
Attorney—Steinberg & Blake ABSTRACT: A control system for controlling the content of one fluid in another fluid. The flow quantity of the mixture of the two fluids is measured and the content of the one fluid in the other fluid is also measured. An electronic computer is used to control the quantity of the one fluid which is to be added to the mixture in order to maintain the content of the one fluid in the mixture at a predetermined value.

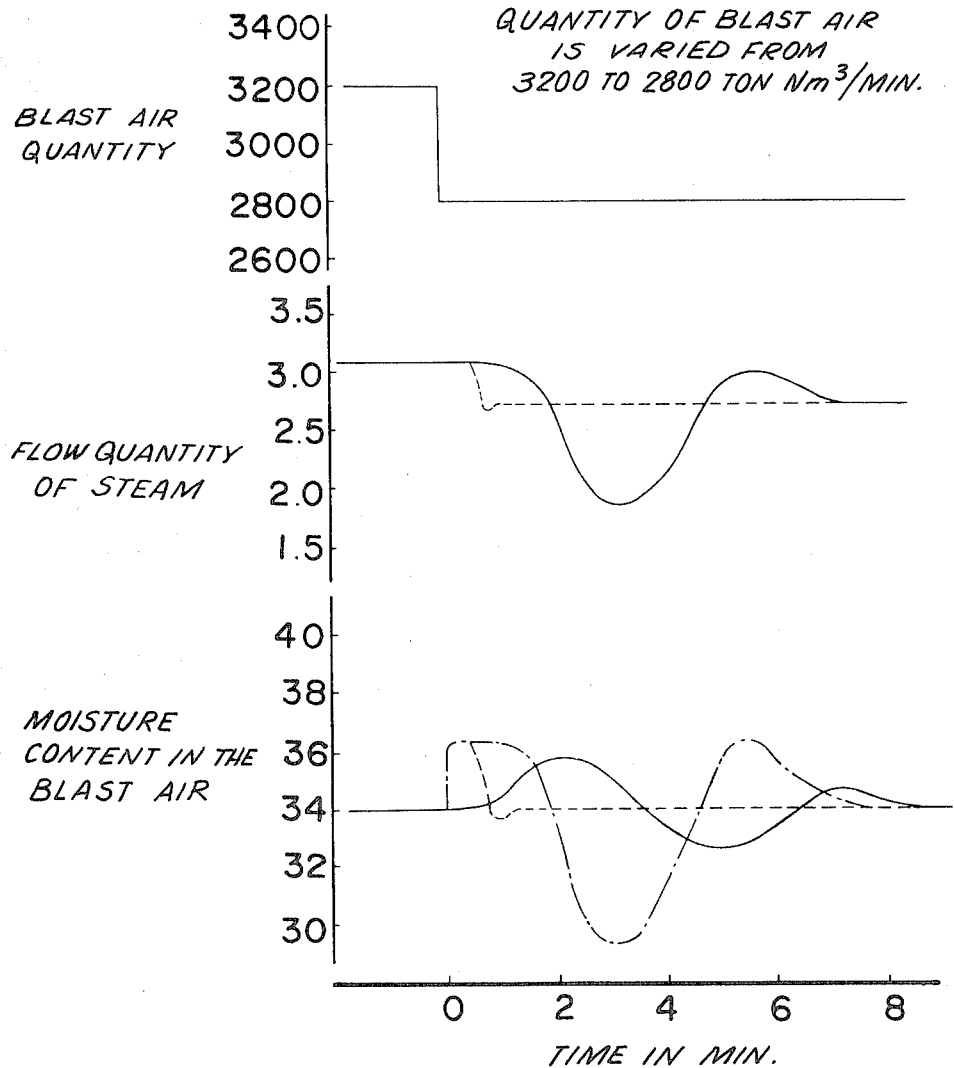

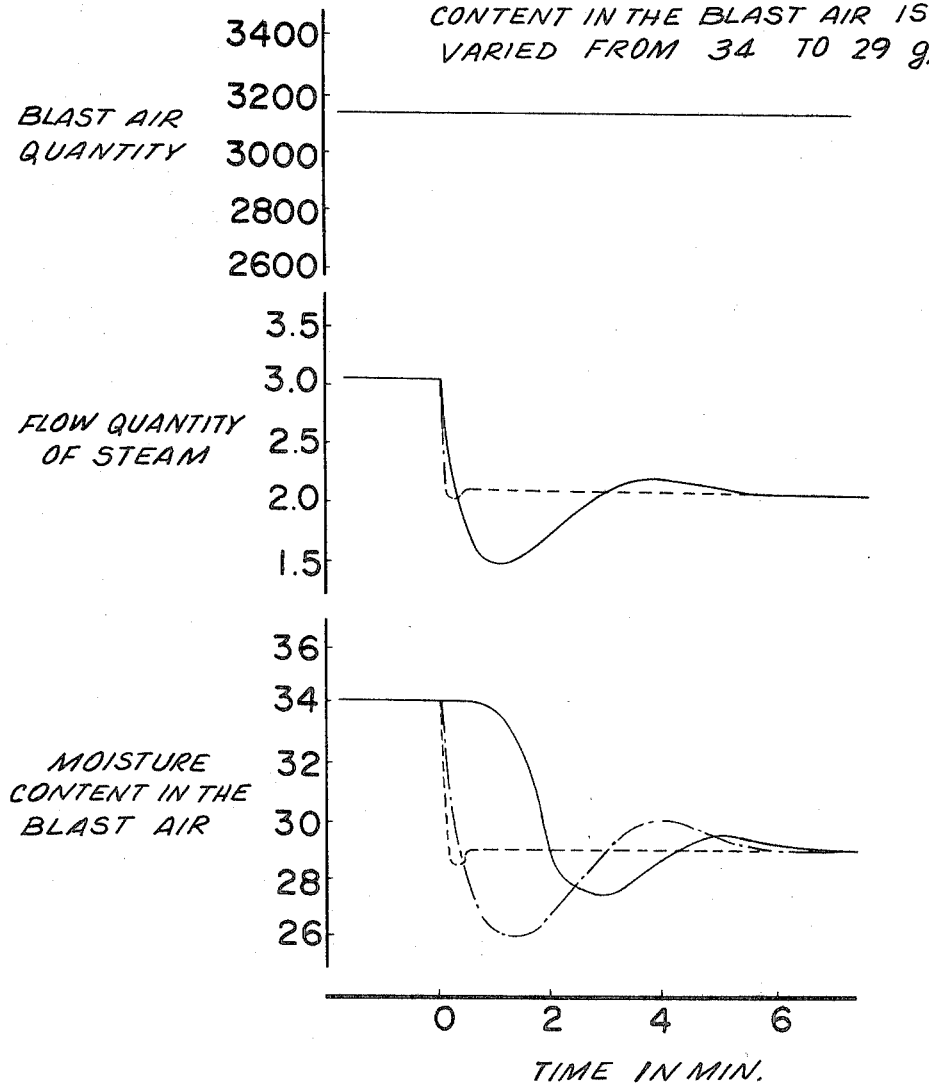

SYSTEM FOR CONTROLLING THE CONTENT OF ONE FLUID IN ANOTHER FLUID

BACKGROUND OF THE INVENTION

This invention relates to a control system for controlling the content of a second fluid incorporated into a first fluid. Where the first fluid A contains the second fluid B and the content of the latter varies gradually, it is often desirable to add fluid B to maintain its content at a predetermined constant value. In such a case, the flow quantity of the first fluid A often varies and besides, it is often required to vary the content of the second fluid B. If a control device of high sensitivity were utilized to control the flow quantities of both fluids A and B without any time lag, then even when the flow quantity of fluid A or the desired content of fluid B are varied it would be possible to precisely maintain the content of fluid B at the desired value and to add adequate quantity of fluid B so as to minimize the deviation of the content thereof from the predetermined value when the content varies gradually. However, the measuring apparatus of the content of fluid B generally has an inherent time lag which causes a hunting in the control.

Taking a blast furnace as an example, fluid A corresponds to the blast air supplied to the blast furnace and fluid B to the moisture in the atmospheric air and steam added to the blast air.

In such a case, it is necessary to provide a control system which can maintain the content of the moisture in the blast air at a desired value without the danger of transient increase or decrease of the moisture content when the moisture content of the atmospheric air changes or when the desired content of the moisture is varied intentionally.

Heretobefore, to control the moisture content of the air supplied to a blast furnace, a so-called steam quantity direct control system has been used wherein a portion of the air is sampled and supplied through a conduit to a thermostatic tank containing a lithium chloride dew-point hygrometer to detect the humidity of the air as a voltage corresponding to the dew point, that is, $g(H_2O) / Nm^3(air)$, where N indicates the normal gas state at which pressure is equal to one atmosphere and temperature is $0°$ C., and the difference between this voltage and a reference voltage corresponding to the desired moisture content of the air supplied to the blast furnace is utilized to control the quantity of the steam to be added to the blast air. Another prior system is the steam quantity cascade control system wherein above described voltage difference is used to set a steam quantity adjusting meter to a desired steam quantity.

However, the response of the lithium chloride dew-point hygrometer is very slow and often requires about 10 minutes until it provides a stable output. As a result, with such a steam quantity direct control system, sudden decrease in the air quantity results in the surplus of the steam quantity, thereby abnormally increasing the moisture content in the air supplied to the blast furnace. However, as the apparent moisture content as determined by the lithium chloride dew-point hygrometer does not vary so rapidly, it is impossible to maintain the moisture at the desired value. When the quantity of the blast air is increased rapidly, an opposite phenomenon occurs.

When the desired value of the moisture content in the blast air is rapidly increased, as the moisture content detected by the dew-point hygrometer gradually approaches to the modified or increased desired value as the flow quantity of the steam is increased rapidly, excess quantity of the steam will be added thus resulting in the surplus moisture content. Rapid decrease in in the desired moisture content results in the opposite phenomenon.

On the other hand, with the steam quantity cascade control system, when determining the desired quantity of the steam from the deviation of the moisture content in the air, the deviation is subjected to proportionating, integrating and differentiating operations (PID operation) in order to avoid abnormal increase or decrease in the moisture content. Strictly speaking, however, it is necessary to modify this operation in accordance with the quantity of the blast air, the moisture content thereof and the quantity of the steam incorporated so that it is extremely difficult to obtain a perfect control.

SUMMARY OF THE INVENTION

It is, therefore, a general object of this invention to provide a novel control system capable of maintaining the content of a second fluid in a first fluid at a predetermined desired value when the content of the second fluid varies gradually and when the desired value is varied intentionally.

More specific object of this invention is to provide a control system which can maintain the moisture content in the air supplied to a blast furnace at a predetermined desired value when the moisture content in the atmosphere or the flow quantity of the blast air varies or the desired value of the moisture content in the blast air is varied.

Further object of this invention is to provide an improved control system which is free from the influence of the inherent delay in the response of a conventional moisture detector such as a lithium chloride dew-point hygrometer.

Generally speaking, in accordance with this invention, when the flow quantity of blast air or the desired value of the moisture content therein is varied, the quantity of the steam to be increased or decreased is calculated by a computer to directly control the quantity of the steam incorporated to the blast air, whereas when the moisture content of the atmosphere varies gradually, the steam quantity o be incorporated is corrected by a conventional dew-point hygrometer.

The control system embodying this invention for maintaining the content of a second fluid in a first fluid at a predetermined value comprises means to detect the flow quantity of the mixture of the first and second fluids to produce a first voltage representing the flow quantity of the mixture, means to detect the content of the second fluid in the mixture to produce a second voltage representing it, means to produce a third voltage representing the reference value of the content, a source of the second fluid, an electronic computer responsive to the first, second and third voltages to control the quantity of the second fluid to be added to the mixture from the source in accordance with a prescribed equation to be described hereinafter.

In the case of controlling the content of moisture in the air supplied to a blast furnace, the first fluid is the atmosphere and the second fluid is the moisture contained in the atmosphere or steam to be incorporated to the blast air. The invention is applicable to other applications, for example, to the control of the composition of a mixture of different gasses or to the control of the value of pH of liquids.

BRIEF DESCRIPTION OF THE DRAWINGS

The organization and operation of this invention together with its further objects and advantages thereof will be more fully understood from the following detailed description taken in conjunction with the accompanying drawings in which:

FIGS. 2 and 3 show sets of curves to compare the accuracy of moisture content in the blast air controlled in accordance with the control system of this invention and with a prior control system wherein FIG. 2 shows a case in which the air flow is varied from 3,200 to 2,800 $Nm.^3/min.$, whereas in FIG. 3, the desired or reference value of the moisture content in the blast air is changed from 34 $g./Nm.^3$ to 29 $g./Nm.^3$.

DESCRIPTION OF THE PREFERRED EMBODIMENTS

Figure 1:
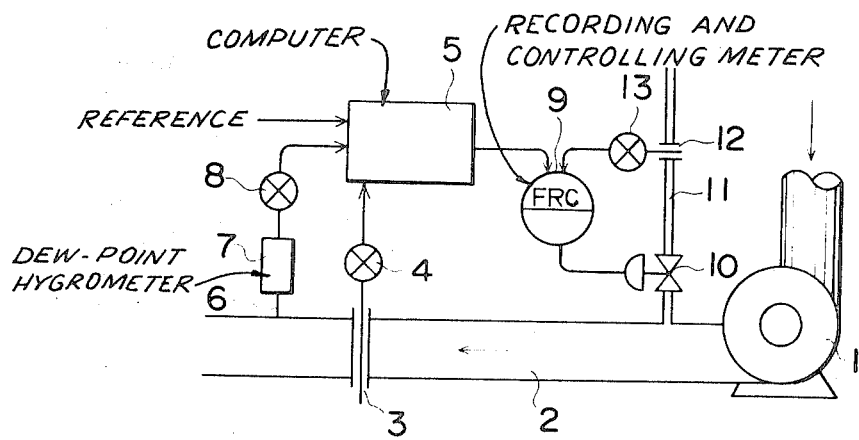
FIG. 1 is a diagrammatic representation of one embodiment of the novel control system as applied to the moisture content in the air supplied to a blast furnace.

As shown in FIG. 1, air is supplied to a blast furnace, not shown, via conduit 2 by means of a blower 1. The flow quantity of the blast air is detected by an orifice 3 provided for conduit 2 and supplied to a computer 5 as a voltage or electric signal by means of an air quantity transmitter 4. A portion of the air in the conduit 2 is supplied to a lithium dew-point hygrometer 7 by a branch conduit 6 so as to produce a voltage corresponding to the dew-point which is applied to the computer 5 via a converter 8. Also a reference signal representing the desired moisture content is set in the computer as indicated by the arrow at the upper left portion of FIG. 1; as the flow quantity or the desired moisture content is varied, the computer calculates the quantity of the steam to be increased or decreased to apply the result to a recording controller for the steam flow 9 to control the quantity of steam admitted into conduit 2 from a source of supply of steam 11 by means of a regulator valve 10. The quantity of the stem admitted is fed back to the recording controller 9 by means of an orifice 12 in pipe 11 and a flow quantity transmitter 13.

According to this invention, the control system is constructed to determine and regulate the desired value of the steam flow according to the following equation:

$$S = S_{-1} \cdot \frac{V}{V_{-1}} + \frac{60}{10^6} V(M - M_{-1}) + K \cdot \frac{60}{10^6} V(M - M_I) \quad (1)$$

WHERE $S$: The steam quantity required (ton per hour)

$S_{-1}$: The steam quantity required, determined by the previous calculation (that is the previous scanning of the computer). The period of calculation (or scanning) is 1 minute. $U$: The air flow quantity Nm.³/min.

$V_{-1}$: The air flow quantity at the time of previous scanning. Nm.³/min.

$M$: The desired value (reference value) of the moisture content in the blast air g./Nm.³

$M_{-1}$: The desired value of the moisture content in the blast air at the time of previous scanning g./Nm³

$M_I$: The humidity of the blast air as measured by the lithium chloride dew-point hygrometer.

$K$: The coefficient for sensitivity of steam correction 0.10 ≈ 0.05

In equation 1, the first term $$S_{-1} \cdot \frac{V}{V_{-1}}$$

represents the quantity to be varied in proportion to the air quantity as the quantity of the blast air is varied. The second term $$\frac{60}{10^6} V(M - M_{-1})$$

represents the steam quantity which is surplus or short when the desired or reference value of the moisture content in the blast air is varied, while the third term represents the steam quantity corresponding to the difference between the moisture content $M_I$ in the blast air as determined by the lithium chloride dew-point hygrometer and the desired value of the moisture content.

Owing to the inherent detection lag of the humidity quantity $M_I$, it is not possible to control the flow quantity of the steam by the term $$\frac{60}{10^6} V(M - M_I)$$

by controlling the steam quantity by 1/10 (that is $K=0.1$ of this term, in case where the moisture content in the blast air varies very little, for example, less than 10 g./Nm.³. The control is substantially ineffective immediately after occurrence of such a small change so that deviation from the desired value of the moisture content due to gradual large variation such as the change of the humidity of the atmosphere can be prevented.

The control system of this invention improves the accuracy of the control of the moisture content in the blast air as shown in FIGS. 2 and 3. In these FIGS. solid lines show quantities of air, steam and moisture content in the blast air which are measured by a flow meter and a hygrometer in a prior art steam cascade control system, dot and dash lines the moisture content in the blast air calculated by the quantities of steam and air also in the conventional steam cascade control system, and dotted lines the quantity of steam measured and the moisture content calculated from steam flow in this invention system.

As can be clearly noted from FIGS. 2 and 3, according to this invention, even when the quantity of the air or the desired value of the moisture content in the blast air is varied as the moisture content does not abnormally increase or decrease, as was the previous case, it is possible to avoid occurrence of abnormal conditions of the blast furnace such as slip or hanging, thus decreasing the production loss caused thereby. The merit of this invention is further increased because the change in the quantity of blast air occurs each time the operation of the hot stoves used for blast furnaces is switched because the change in the desired value of the moisture content is effected more frequently by the adoption of the computer control.

Although the present invention has been described in terms of the control of the moisture content in the air supplied to a blast furnace, the novel system of controlling the ratio of the components of a mixed fluid can also be applied to the following cases.

1. Caloric control of a mixed gas

In a steel manufacturing factory, it is usual to prepare gas to be burned in a coke furnace by admixing blast furnace gas which is cheap and of low calorie with coke furnace gas which is rather expensive and of high calorie to obtain a mixed gas of the desired calorie. In such a case, although the ratio of the blast furnace gas and the coke furnace gas has been controlled where the required heat quantity varies, the response of the calorie meter is slow. The novel computer control system is effective to this case.

2. Control of the value of pH of drains

Waste of pickling liquid for steel plates is usually drained after being neutralized with lime water; but the concentration and quantity of the waste varies from time to time. As a result, the quantity of the lime water utilized varies accordingly Moreover, since the neutralizing tank has a considerably large capacity, the measurement of pH after neutralization accompanies substantial time lag.

Although the set value of the pH after neutralization is constant, the quantity of the waste as well as its pH varies substantially. The computer control system of this invention can be advantageously used in this field.

While the invention has been shown and described in terms of a preferred embodiment thereof, it will be clear that many changes and modifications will be obvious to those skilled in the art without departing from the spirit and scope of the invention as defined in the appended claims.

What is claimed is:

1. In a system for controlling the content of a second fluid in a first fluid by controlling the quantity of said second fluid which is added to said first fluid, the improvement which comprises first means to detect the flow quantity of a mixture of said first and second fluids to produce a first voltage representing said flow quantity of said mixture, second means to detect the content of said second fluid in said mixture to produce a second voltage representing said content, third means to produce a third voltage representing a reference value of said content, said second means having a relatively slow response as compared to said first and third means for providing said second voltage with a substantial time lag as compared to the producing of said first and third voltages by said first and third means, respectively, a source of said second fluid for adding the latter to said first fluid, an electronic computer means operatively connected with said first, second, and third means for receiving said voltages as signals therefrom, and control means operatively connected to said computer means and said source for receiving an output from said computer means to control the quantity of said second fluid to be added to said first fluid from said source, said computer means operating to control said quantity of said second fluid added according to an equation $$S = S_{-1} \cdot \frac{V}{V_{-1}} + \frac{60}{10^6} V(M - M_{-1}) + K \cdot \frac{60}{10^6} V(M - M_I)$$

where $S$ represents the flow quantity of said second fluid to be added in tons per hour, the first term includes $S_{-1}$ representing the flow quantity of said second fluid to be added which was determined by the previous calculation of said computer $V$ representing the flow quantity of said first fluid in Nm.³/min., and $V_{-1}$ representing the flow quantity of said first fluid determined by the first calculation in Nm.³/min., the second term includes in addition to $V$, $M$ representing the reference value of the content of said second fluid in said first fluid in grams per Nm.³, and $M_{-1}$ representing the reference value of the content of said second fluid in said first fluid determined by the previous calculation in grams per Nm.³, and the third term includes in addition to $V$ and $M$, $M_I$ representing the relative content of said second fluid in said first fluid measured by a conventional meter forming part of said second means, and $K$ the coefficient for sensitivity of correction, said coefficient having a value on the order of 0.10 to 0.05, so that changes in said flow quantity and reference value will provide through said computer means relatively direct and rapid operation of said control means while relatively small gradual changes in detection of the content of said second fluid in said mixture by said second means will be prevented from changing the desired control of the addition of said second fluid to said mixture by said control means in response to signals from said first and third means due to the lag in the operation of said second means and the small value of said coefficient.

2. The control system as claimed in claim 1 wherein said mixture of said first and second fluid is blast air supplied to a blast furnace, said first fluid being atmospheric air and said second fluid being steam, a first conduit for supplying said mixture to a blast furnace, said first conduit being operatively connected with said first and second means which respectively detect said flow quantity and said content of said second fluid in said mixture flowing through said first conduit and a second conduit forming at least part of said source and communicating with said first conduit upstream of said first and second means, said second conduit being operatively connected with said control means to be controlled thereby for regulating the addition of said second fluid to said mixture.

3. The control system as claimed in claim 2 wherein said conventional meter is a lithium chloride dew-point hygrometer of slow response.

4. In a system as recited in claim 1 and wherein said first fluid is a gas and said second fluid is moisture in said gas forming said mixture therewith, said second means detecting the moisture content in said gas of said mixture and said control means controlling the quantity of moisture to be added to said mixture.

5. In a system for controlling the content of a second fluid in a first fluid by controlling the quantity of said second fluid which is added to said first fluid, conduit means for directing a mixture of said first and second fluids along a predetermined path, first means operatively connected with said conduit means for detecting the flow quantity of the mixture of said first and second fluids to produce a first voltage representing said flow quantity of said mixture, second means operatively connected with said conduit means for detecting the content of said second fluid in said mixture to produce a second voltage representing said content, third means to produce a third voltage representing a reference value of said content, said second means having a relatively slow response and operating with a substantial lag as compared to said first and third means, a source for said second fluid communicating with said conduit means, electronic computer means operatively connected with said first, second and third means for responding to said first, second and third voltages to receive the latter as inputs to said computer means, said computer means providing an output which is relatively rapid with respect to the inputs from said first and third means and which, with respect to the input from said second means, has a substantially reduced effect as compared to said first and third means, and control means operatively connected with said computer means to receive said output therefrom and to be controlled thereby, said control means being operatively connected with said source for regulating the latter to control the quantity of said second fluid to be added to said first fluid, whereby relatively small gradual changes detected by said second means will have substantially no influence on the controls provided by said control means.

6. The combination of claim 5 and wherein said first fluid is atmospheric air and said second fluid is the moisture content of said air, said second means including a lithium chloride dew-point hygrometer.

* * * * *